(12) United States Patent
Harriman

(10) Patent No.: US 10,120,058 B2
(45) Date of Patent: Nov. 6, 2018

(54) SYSTEM AND METHOD FOR LOCATING A POINT IN SPACE

(71) Applicant: Adam Harriman, Palm Bay, FL (US)

(72) Inventor: Adam Harriman, Palm Bay, FL (US)

( * ) Notice: Subject to any disclaimer, the term of this patent is extended or adjusted under 35 U.S.C. 154(b) by 199 days.

(21) Appl. No.: 14/934,358

(22) Filed: Nov. 6, 2015

(65) Prior Publication Data

US 2016/0061928 A1   Mar. 3, 2016

Related U.S. Application Data

(62) Division of application No. 13/400,206, filed on Feb. 20, 2012, now Pat. No. 9,182,469.

(60) Provisional application No. 61/507,350, filed on Jul. 13, 2011.

(51) Int. Cl.
  *G01S 3/44*    (2006.01)
  *H01Q 3/04*    (2006.01)
  *H01Q 3/26*    (2006.01)
  *G01S 3/02*    (2006.01)

(52) U.S. Cl.
  CPC .............. *G01S 3/44* (2013.01); *H01Q 3/04* (2013.01); *H01Q 3/26* (2013.01); *G01S 3/023* (2013.01)

(58) Field of Classification Search
  CPC .. G01S 3/44; G01S 3/023; H01Q 3/04; H01Q 3/36
  USPC ..... 342/359, 367, 432, 451, 360; 455/562.1, 455/226.2, 115.1
  See application file for complete search history.

(56) References Cited

U.S. PATENT DOCUMENTS

| | | | | |
|---|---|---|---|---|
| 5,929,809 A | * | 7/1999 | Erlick ............... | H01Q 3/267 342/174 |
| 6,914,559 B2 | * | 7/2005 | Marks ................ | G01S 3/48 342/428 |
| 7,313,403 B2 | * | 12/2007 | Gong ................. | G01S 3/28 455/404.2 |
| 7,633,442 B2 | * | 12/2009 | Chiang ............... | H01Q 3/24 342/432 |
| 2010/0321244 A1 | * | 12/2010 | Kelly ................ | G01S 3/023 342/451 |

* cited by examiner

*Primary Examiner* — Frank J McGue
(74) *Attorney, Agent, or Firm* — Ferdinand M. Romano; Accel IP Law, PLLC

(57) ABSTRACT

A method for locating a point in a first region based on receipt of a rf signal from the point. An antenna array is in the first region at a first position rotatable about an axis. A series of phase-array patterns is provided for implementation with the antenna array to provide measures of rf signal strength. Each pattern provides a plurality of reference values as a function of angle. A plurality of the phase-array patterns are used to acquire, in the first region, a plurality of rf signal strength values based on reception of the rf signal. A set of correlation values is determined where each value is a correlation between signal strength reference values and rf signal strength values acquired based on reception of the rf signal from the point. The correlation values identify a direction relative to the first position along which the point is located.

7 Claims, 8 Drawing Sheets

SYSTEM AND METHOD FOR LOCATING A POINT IN SPACE

RELATED APPLICATION

The invention of the present application is a Divisional of U.S. patent application Ser. No. 13/400,206, filed on Feb. 20, 2012, which claims priority to provisional patent application U.S. 61/507,350 filed Jul. 13, 2011 which is incorporated herein by reference in the entirety.

FIELD OF THE INVENTION

The present invention relates to acquisition and characterization of position data useful for pointing in the direction of an object or determining the location of an object. More particularly, embodiments of the invention enable determination of the position of an object with improved effectiveness and reliability based on receipt of rf signals in a variety of environments. In one example, the system and method are applied to large terrestrial regions where the signal propagates over a ground plane.

BACKGROUND OF THE INVENTION

Many systems have been developed which require locating an object in a coordinate system or at least pointing to an object with high alignment precision. In many instances, when components of a system are to be aligned with respect to one another, the components are situated large distances, e.g., multiple miles, apart. In the past, the processes of pointing and locating have been subject to time consuming effort due to numerous difficulties, including line of sight impediments, relatively large fields of view and noise generally. Alignment with, or determination of, directionality vectors (e.g., horizontal and vertical angles relative to a reference position) is a necessary step for operation of many systems, including tracking and locating systems, photographic equipment, communications links and radar systems. To the extent the equipment is mobile, there must be a repetitive process of performing the alignments. In sensitive communication systems, the data exchanges between the elements of the system can be easily compromised with slight movement of a component. It is at times important to periodically provide for direction determinations and realignments as needed. Otherwise, critical signal may be lost. Also, system calibration may degrade or be lost due to vibration which introduces small displacement, wear or maintenance activities which remove or replace components.

Once directionality vectors are determined, a system can be mechanically displaced, e.g., rotated, or electronically adjusted, to perform an alignment or to correct for misalignments. For example, an antenna may be aligned with respect to a relatively weak non-terrestrial source by rotation once a locating system determines the direction of location. In the past, many processes or systems have been used alone or in combination to accurately make the determinations. Perhaps most commonly, optical line of sight techniques (e.g., boresight and laser-based alignments) have played a key role in many such systems. However, the systems have difficulty operating in low signal-to-noise environments. When alignments are performed over distances greater than a kilometer, changes in atmospheric conditions can introduce highly variable delays in the alignment process. Cloud cover, fog, precipitation, optical distortions due to thermal gradients and other visibility factors are frequent impediments.

SUMMARY OF THE INVENTION

A feature of the invention is use of an rf system which in numerous embodiments may be used to perform an entire alignment or location determination, or provide alignment or location in one of two or more subprocesses in an alignment process. When used to supplement a conventional. e.g., optical, alignment process, the position of one element spaced several km or further from another element can be rapidly determined by, for example, first determining a location range, e.g., within a solid angle, based on rf signal data, and then using a conventional technique such as an optical alignment procedure.

In one exemplary embodiment a method is provided for locating a point in a first region based on receipt of a radio frequency (rf) signal that emanates from the point. An antenna array is at a first position in the first region and rotatable about a first axis. A series of phase-array patterns are for implementation with the antenna array are used to provide measures of rf signal strength. Each phase-array pattern is used to provide a plurality of phase-array signal strength reference values as a function of angle of rotation about the first axis. Further, a plurality of the phase-array patterns are used with the antenna array at the first position to acquire, a plurality of rf signal strength values. Each value is based on reception of the rf signal that emanates from the point. A set of correlation values is determined, where each value is a correlation between (i) signal strength reference values acquired with patterns in the series at one of the angles and (ii) the rf signal strength values acquired with the antenna array which are each based on reception of the rf signal that emanates from the point. The correlation values are used to identify a direction relative to the first position along which the point is located.

According to another embodiment a method is provided for determining a pointing direction. A set of phase array receive patterns is provided, each pattern having a different response characteristic to a source as a function of angle. Signal strength data is received from the source with each of the patterns. A comparison is made between the signal strength data from all of the patterns and each member in a group of data sets. Each member in the group of data sets comprises signal strength data acquired with the phase array receive patterns at one of a plurality of angle orientations with respect to a known source location. A first determination is made of the pointing direction based on the comparison.

In yet another embodiment, a method is provided for defining a set of receive patterns for use in a phase array antenna system to determine the direction of an object.

BRIEF DESCRIPTION OF THE DRAWINGS

The invention is explained in the following description in view of the drawings wherein.

DETAILED DESCRIPTION OF THE INVENTION

According to one series of embodiments, the invention is described in the context of a system and a method for locating a point in space based on receipt of a radio frequency (rf) signal from the point. In the illustrated example, all of the components are terrestrially based, but the invention is not limited to determination of location with respect to propagation between points over a ground plane. As used herein, the term point corresponds to a point in space or to a region associated with the location of an object wherein the location of the region could be approximately described by the point.

Figure 1:
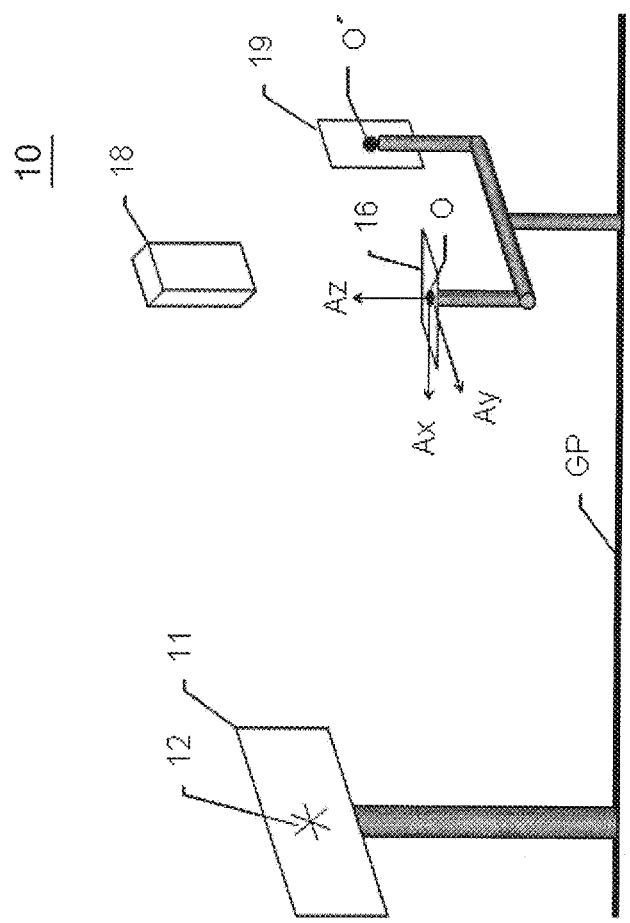
FIG. 1 illustrates a system for establishing the direction of location of an object based on a radiating source relative to a reference axis.
Figure 2:
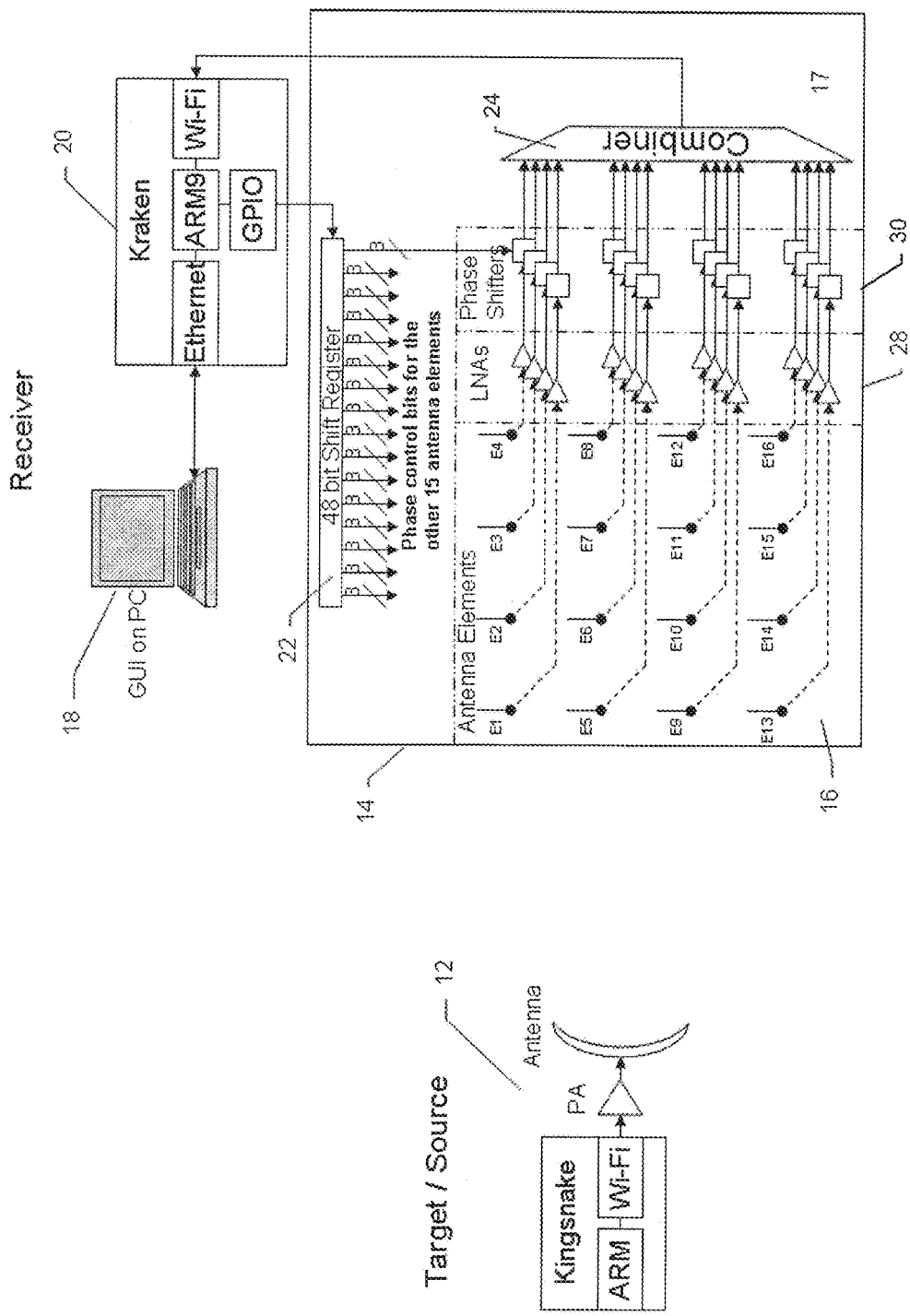
FIG. 2 is a schematic diagram illustrating components of the system of FIG. 1.

According to an embodiment of the invention, FIGS. 1 and 2 illustrate components of a system 10 for establishing the direction of location of an object 11 based on a radiating source 12 co-located with the object. The direction of location, i.e., a pointing direction, is determined relative to a position which is the origin, O, of a reference coordinate system. Programmable phase array circuitry 14, comprising an antenna array 16 placed at the origin, receives signals from the source 12 in accord with a sequence of predefined receive patterns. The array 16 is oriented in a reference position that is known with respect to a set of axes in the coordinate system. In some embodiments the antenna array 16 may be rotated through a selectable angle with respect to the reference coordinate system. Determination of the direction of location is based on defining and sequentially using the sequence of antenna receive patterns to collect signal strength data from the source 12.

The system 10 and the source 12 are shown in spaced-apart relation, with the source 12 and the antenna array 16 located an arbitrary distance from one another. For a 2.4 GHz signal the system may provide best results when the distance between the source 12 and the antenna array 16 is more than 200 meters. However, at this and other signal frequencies, the system 10 may provide useful results when the distance between the source 12 and array 16 ranges from less than 200 meters to more than 10 kilometers.

The reference coordinate system is illustrated as a conventional x, y, z Cartesian system having orthogonal axes $A_x$, $A_y$, $A_z$ and the origin, O, at x=0, y=0 and z=0. In this example, the source 12 is an rf source of arbitrary frequency, e.g., 2.4 GHz, but may be any of a wide variety of electromagnetic radiating sources. The exemplary source 12, shown positioned above a ground plane GP, is divergent as is characteristic of typical point source propagation. In other embodiments the source may exhibit an arbitrary propagation pattern or a highly directional pattern. The field pattern may be relatively complex as may be due to the presence of reflective surfaces.

The system 10 includes a control center 18 connected to the phase array circuitry 14 through processing circuitry 20. A number of different of architectures may be chosen for implementing the system 10 based on, for example, size and weight constraints, power requirements, desired speed and level of accuracy. The control center 18 is shown in FIG. 1 as a handheld device and is shown in FIG. 2 as a notebook computer having greater processing power to perform, for example, correlations between sets of received signal strength values. Processing tasks associated with (i) determining sets of receive patterns, (ii) provision of phase-related circuit adjustments to the phase array circuitry 14 for individual patterns, and (iii) processing of phase adjusted data received from the circuitry 14, may be distributed among the phase array circuitry, the control center 18 and the processing circuitry 20 in a variety of configurations. In the example embodiments the control center 18 provides multiple choices of processing options, allowing the user to control the speed and accuracy of the process by which direction of location is determined. Selection of processing options is made via a graphical user interface (GUI) of the control center.

The circuitry 20 processes stored information received from the control center (e.g., to generate sets of phase vectors defining each receive pattern in a set) based on user inputs to the control center 18 determinative of speed and accuracy. The phase information defining each pattern is transmitted to the programmable phase array circuitry 14. A series of electrical phase configurations are effected in circuitry which receives signals from the antenna array 16 according to the individual receive patterns in the set. Phase vectors $V_j$ (j=1 to k), which each define one of k antenna receive patterns, are applied to sequentially configure the phase array circuitry 14 according to each receive pattern.

The phase array circuitry 14 comprises the antenna array 16 centrally positioned about the origin, O, above the ground plane GP. The array 16 may, as shown, be elevated with respect to the ground plane GP and perhaps placed at the same elevation of a pointing device 19. The device 19 may be part of a monitoring or communications system which relies upon the system 10 to determine the source location or a pointing angle between the device 19 and the source 12. Using this information, perhaps in conjunction with a series of coordinate transformations, the device 19 can be directed toward the source 12. To effect high precision alignments, the pointing device 19 may be oriented about the origin O' in a second coordinate system where the origin O' is offset from the origin O by a known set of displacements. Based on transformations, one can establish orientation angles to point the device 19 in a direction toward the source 12.

The device 19 may be a directional antenna used in communications applications or may be a radar antenna which is to be aligned with the source 12.

The antenna array 16 comprises a matrix of n elements $E_i$ positioned along a flat plane defined by a board 17 on which the elements $E_i$ and related processing circuitry 14 are mounted. For the embodiment illustrated in FIG. 2, an exemplary array 16 has n=16 elements $E_i$ arranged in a matrix of four rows and four columns. Each vector $V_j$ contains n values of phase shift information $PS_i$, with each value corresponding to one of the n elements $E_i$. The vectors $V_j$, each defining one of k receive patterns $P_j$, are each applied as a programming input to the phase array input circuitry (e.g., comprising shift register 22) to serially generate the receive patterns $P_j$. Each of the n values of phase shift information $PS_i$ in a vector $V_j$ defines a phase shift imparted to a signal $s_i$ received by a corresponding one of the n elements $E_i$ in the antenna array 16. Output processing circuitry (e.g., comprising combiner circuitry 24) sums the phase shifted signals $s_i$ for each receive pattern $P_j$ to generate a series of signal strength data based on the sequence of applied vectors. Thus, with each vector $V_j$ defining a configuration of the array circuitry 16 corresponding to one pattern in a set of k phase array patterns, the system 10 generates a series of k received signal strength values for the entire set of patterns which signal strength values are compared to reference data in order to establish the direction of the source 12.

The board 17 is initially oriented in a reference position centered at the origin, O, about which the board 17 and the array elements $E_i$ may be rotated to selectable angles with respect to the axes $A_x$, $A_y$, $A_z$.

The system 10 is used to establish a pointing angle, relative to the origin, O, which defines a direction in which the source 12 is located. The system 10 determines a Most Likely Angle (MLA) that, based on correlations, defines an angle corresponding to the direction in which the source 12 is located. Summarily, during field operation of the system 10 the phase array circuitry 14 is sequentially programmed with the n values of each of the k vectors $V_j$. While the antenna elements acquire signal strength data from the source 12, the system steps through the k configurations of phase array antenna receive patterns. For each configuration, a signal $s_i$, (i=1 to n) is received by each of the n elements $E_i$ in the antenna array and the signals $s_i$ are each temporally adjusted in accord with the phase shift information $PS_i$ of each vector $V_j$. The phase shifted values of individual signals $s_i$ for each pattern are then summed to provide a received signal strength value for each pattern in the set.

To impart phase shifts, followed by summing for individual receive patterns in the set, the signals $s_i$ received from the source 12 by individual elements of the antenna array are each passed through amplification circuitry in an amplification stage 28 and then through a stage of phase shifting circuitry 30 programmed in accord with each of n outputs from the shift register 22. Thus for each pattern a phase shift is imparted to each signal $s_i$ received from each element $E_i$ in accord with the n values in an applied vector $V_j$. The n phase shifted values $s_i$ in each set generated for each pattern are then processed through the combiner circuitry 24 to generate a phase adjusted received signal strength data value $SS_j$. Each value $SS_j$ is based on an individual phase vector $V_j$ and corresponds to one of k receive patterns $P_j$. A series of summed signal strength values, $SS_j$, derived from the k different phase vectors $V_j$, is used to perform correlation analyses by which the direction of the source 10 is determined relative to a point in the coordinate system.

Correlations are performed between the series of values $SS_j$ and reference data sets of signal strength values. Each of the reference data sets is acquired under controlled conditions at one in a series of angle orientations between the antenna array 16 and a known location of a source. Processing associated with the correlation analyses may be performed in the circuitry 20 or in the control center 18.

Using the foregoing procedure in an iterative process, the board 17 may be physically adjusted, e.g., rotated about the origin, O, to change the pointing direction of the array of elements $E_i$ relative to the most recently determined direction of the source 12. Each iteration brings the system 10 closer into alignment with the source 12. In each subsequent iteration of the process, signal data $s_i$ are again acquired and processed for some or all of the k patterns in the set to more accurately determine the direction of the source.

Results of the correlation analyses are used to identify a region or a point in space in which the source is located. In the illustrated example, the identified region or point in space is in a three-dimensional coordinate system, but the source location may also be determined along a line or plane, e.g., a horizontal plane along the horizon. Generally, for the illustrated example, the source location may be determined as a function of position along a ground plane and as a function of elevation above the ground plane.

In one methodology, for the series of k phase-array receive patterns, $P_j$, with which the field signal strength data values $SS_j$ are measured, correlations are performed between members in the set of k measured data values $SS_j$ and members in each of the multiple sets of k phase-array signal strength reference values acquired at different angles θ along a plane parallel with the ground plane GP and at different angles Φ above the ground plane.

Accuracy of the system 10 in determining a pointing direction may be degraded when the system operates in an environment different from that in which the k phase-array signal strength reference values (RCD values) $SS_{j,θ,Φ}$ are acquired at a plurality of different angles θ and Φ. For example, signal data for particular antenna patterns may include energy resulting from signal reflections specific to the field environment in which the pointing direction is to be determined. A subset of the k antenna patterns is used for field operation of the system 10 in order to minimize the influence of reflections and other sources of error. That is, antenna patterns most affected by such sources of error can be identified and removed from the set of k patterns to form a subset of antenna patterns. It is also desirable to exclude antenna patterns from the subset which, in the field environment, are relatively insensitive to small changes in angle about the pointing direction. According to an embodiment the subset comprises m antenna patterns.

The illustrated embodiment utilizes three types of data which are to be distinguished from one another. A first type of data values $SS_j$, referred to herein as field data values or field measured data values, form the data set obtained by the system 10 based on propagation over a ground plane GP. During field operation of the system 10 the data values $SS_j$ are acquired from a source to determine a pointing direction from the position 13 to the source 12.

During a field calibration procedure, performed in the same environment in which the direction of location of a source is to be determined relative to the position 13, k data values $SS_j$ are acquired from a source to improve the accuracy of the system 10 during field operation. The second type of data are the multiple sets of k phase-array signal strength reference values, $SS_{j,θ,Φ}$, acquired at different angles θ and Φ, referred to herein as Reference Characterization Data (RCD) values. These data values, which may be collected in advance of acquiring the field data values $SS_j$, provide information indicative of a known position of a source as a function of angle relative to a line of reference. The signal strength reference values may be acquired in an environment which may differ from or be more controlled than the environment at the location in which the field data values are obtained.

Using the reference coordinate system of FIG. 1, with the axis $A_x$ serving as a line of reference, the RCD values are derived by initially determining signal strength values for each of the k patterns as a function of angle relative to the line of reference and about the origin O. This may be done at a location different from that at which the field data values are obtained. Angular dependence is assessed as a function of chosen angles θ in the plane formed by the axes $A_x$, $A_y$, relative to the axis $A_x$. For the illustrated embodiments, with the axis $A_x$ serving as a line of reference, the RCD values are derived in part by initially determining signal strength values as a function of chosen angles Φ in the plane formed by the axes $A_x$, $A_z$, again relative to the axis $A_x$.

The signal strength RCD values $SS_{j,θ,Φ}$, being acquired as a function of angles θ and Φ, are members of a larger set of phase-array signal strength reference values than the set of k field measured values $SS_j$ acquired during the field calibration procedure. The values $SS_{j,\theta,\Phi}$ may be obtained with the same source 12 used to acquire values $SS_j$ during field calibration or field operation but, as already noted, the values $SS_{j,\theta,\Phi}$ are not necessarily acquired at the same location in which the field measured data are acquired. Correlation analyses are performed based on data values $SS_j$ and RCD values $SS_{j,\theta,\Phi}$ where the values $SS_{j,\theta,\Phi}$ are collected at different orientation angles of the antenna array 16 about the origin, O, relative to the axis $A_x$.

The signal strength RCD values $SS_{j,\theta,\Phi}$ are formed in subsets. Each subset comprises k values $SS_{j,\theta,\Phi}$ acquired for a different combination of (i) the j=1 to k receive patterns $P_j$, (ii) one angle in a first series of angles θ measured along the horizon, and (iii) one angle in a second series of elevation angles Φ. Summarily, each value $SS_{j,\theta,\Phi}$ is a received signal strength for one antenna receive pattern $P_j$ based on application of one vector $V_j$ at one combination of the angles θ and Φ.

In the illustrated embodiment the origin, O, is the vertex for the angles θ and the angles Φ. The angles θ are measured along a first reference plane parallel with the ground plane. However, in other embodiments, the first reference plane may be any plane and the vertex may be any point in a reference coordinate system. It need not be parallel with the ground plane or the axis in a Cartesian system and the vertex need not pass through the origin of the reference system. In the illustrated example, the first reference plane is the plane passing through the axes $A_x$, $A_y$. The angles Φ are measured along a second reference plane orthogonal to the first reference plane. However, in other embodiments the second reference plane need not be orthogonal to the first reference plane or any axis of a Cartesian system. In the illustrated example, the second reference plane is a plane passing through the axes $A_x$, $A_z$.

Figure 3:
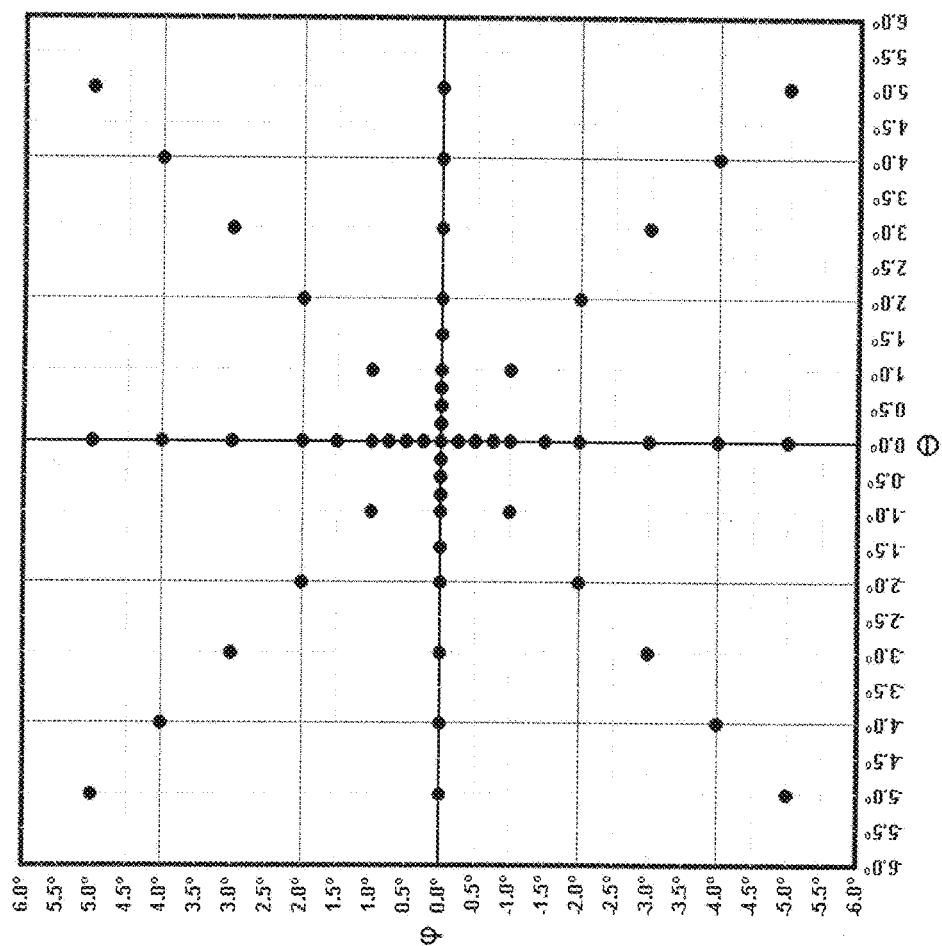
FIG. 3 illustrates an exemplary selection of values for angles θ along a horizontal plane and angles of elevation Φ.

When acquiring signal strength RCD values $SS_{j,\theta,\Phi}$ based on k different patterns, the number of angles θ, the number of angles Φ, the selected values of the angles θ and the selected values of the angles Φ depend on the desired speed and accuracy of locating a point according to the invention. FIG. 3 illustrates an exemplary selection of values for θ and Φ as now described. The angles θ are measured about the origin relative to the axis $A_x$, and in the plane formed by the axes $A_x$, $A_y$. When the iterative process is used: the sequence of chosen angles θ begins with angles that initially change by small increments from the origin, e.g., +/−0.25 degree for displacements up through one degree from the axis $A_x$, then by larger increments of +/−0.50 degree for displacements up through two degrees from the axis $A_x$, and then by still larger increments of +/−1.0 degree for displacements greater than two degrees from the axis $A_x$. Similarly, when the iterative process is used, the angles Φ are measured about the origin relative to the axis $A_x$, but in the plane formed by the axes $A_x$, $A_z$. The sequence of chosen angles Φ begins with angles that change by small increments, e.g., +/−0.25 degree for displacements up through one degree from the axis $A_x$, then by larger increments of +/−0.50 degree for displacements up through two degrees from the axis $A_x$, and then by still larger increments of +/−1.0 degree for displacements greater than two degrees from the axis $A_x$. However, in the presence of a ground plane, the chosen angles Φ may all be angles which reside in quadrants above the plane formed by the axes $A_x$, $A_z$.

The signal strength data values $SS_{j,\theta,\Phi}$ are measured for each of the k receive patterns $P_j$ at all of the combinations of angles θ and Φ. With θ and Φ each ranging from −5° to +5°, when all of the measurements are taken in all quadrants, both above and below the plane formed by the axes $A_x$, $A_z$, fifty seven data sets are generated for each of the k receive patterns $P_j$. Each of the 57 data sets is a collection of received signal strength data $SS_{j,\theta,\Phi}$ acquired at one angle θ and one angle Φ by: (i) rotating the board 17 about the reference position with respect to the plane formed by the axes $A_x$, $A_z$ to a particular angle θ; and (ii) rotating the board 17 about the reference position with respect to the plane formed by the axes $A_x$, $A_z$ to a particular angle Φ. The angles θ of rotation can be made about a pivot point in the plane of the board 17 that is a symmetric center of the array elements E although methods according to the invention do not require that the array elements be formed in a symmetrical array or that the pivot point be at the symmetric center of the array 16. The angles Φ of rotation can be determined with respect to a center line of symmetry of the array elements $E_i$ which line is parallel with the axis $A_y$.

In one example embodiment correlations are performed between the field measured data set and each of the aforedescribed 57 reference characterization data sets (each acquired at one angle θ and one angle Φ). That is, with the set of field measured data values $SS_j$ arranged as an ordered array of values j=1 to k, and each of the 57 data sets of RCD values $SS_{j,\theta,\Phi}$ also arranged as an ordered array of values j=1 to k, the $j^{th}$ value in each of the 58 arrays is a signal strength $SS_j$ or $SS_{j,\theta,\Phi}$, corresponding to the same receive pattern $P_j$. With this arrangement, correlations are calculated between arrays in pairs $<SS_j, SS_{j,\theta,\Phi}>$. The correlations are performed between 57 such pairs of arrays where each array in a pair comprises k data values.

The third type of data referred to herein are Reduced Set Reference (RSR) field characterization data, or RSR field characterization data $FSS_{j,\theta,\Phi}$. These data are acquired in the location environment where field data values will be acquired during operation of the system 10, e.g., to determine the pointing direction of a source. RSR field characterization data $FSS_{j,\theta,\Phi}$ are acquired by performing field measurements at this location with k receive patterns at, for example, one angle θ and one angle Φ. Based on comparisons between signal strength RCD values $SS_{j,\theta,\Phi}$ and a corresponding subset of signal strength data $SS_{j,\theta,\Phi}$ (for the same one angle θ and one angle Φ), the RSR field data $FSS_{j,\theta,\Phi}$ only consists of data acquired with the subset m of receive patterns $P_j$ where m<k. The RSR field data $FSS_{j,\theta,\Phi}$ may be advantageously used to determine a Most Likely Angle (MLA) corresponding to the direction in which the source 12 is located. In one set of embodiments, the subset of m receive patterns provides satisfactory signal strength sensitivity to changes in each angle θ and Φ for a limited range of each angle, e.g., +/−2°.

Operation of the system 10 with the subset of RSR field characterization data values $FSS_{j,\theta,\Phi}$ reduces the time required for data acquisition and processing. The subset of RSR field characterization data values $FSS_{j,\theta,\Phi}$ is derived from a set of k field measured data values $SS_j$ acquired at only one set of angles θ and Φ, i.e., θ=0 and Φ=0. Using a set of tests, the number of receive patterns is reduced from k to m in order to eliminate those which do not provide a desired level of sensitivity in the range where θ and Φ each vary, for example, from −2° to +2°. When the m receive patterns are used for operation of the system 10 to acquire the set of field measured data, there are m signal strength data values $SS_j$, each corresponding to one of m receive patterns $P_j$.

Generally, the reduced set of m receive patterns $P_j$ (i.e., m<k) is determined with criteria that select a subset of the k patterns relatively insensitive to reflections and other factors which can degrade accuracy of the system 10, and criteria which result in a subset of patterns exhibiting a relatively greater sensitivity to changes in angle over a desired range. That is, patterns having a relatively low sensitivity to changes in direction of the array 16 about the pointing angle are not included in the subset of m patterns. Accordingly, patterns which do not exhibit as much sensitivity are not included in the subset of m patterns. The criteria may be applied to the full set of k patterns for each combination of angles θ and Φ, e.g., for the 57 pointing directions illustrated in FIG. 3.

In one embodiment, the reduced set of m receive patterns $P_j$ for collection of field data values is formed in the following process. When the array 16 is positioned to acquire field characterization data $SS_j$ at one angle θ and one angle Φ, relative to a source of known location, there can be significant ambiguity with respect to the orientation of the array 16 such that the angles θ and Φ are not precisely known and may not precisely match a combination of angles θ and Φ used to acquire the RCD values.

A closest match is sought between the angles θ and Φ used to acquire the field characterization data and the multiple sets of angle combinations, e.g., 57 combinations, of angles θ and Φ used to acquire the RCD values. Noting that for each set of angles θ and Φ there is an array of k RCD signal strength values, and that the field characterization data acquired at one angle θ and one angle Φ is an array of k values $SS_j$, this selection can be accomplished by calculating the cross correlation between each of the arrays of k RCD signal strength values and the array of k field characterization data values $SS_j$. The angles θ and Φ of the array of RCD signal strength values having the highest correlation with the array of field characterization data values $SS_j$ are selected as the angles (referred to herein as angles $θ_o$ and $Φ_o$) which most closely correspond to the angles θ and Φ at which the field characterization data has been acquired. Once a determination of the angles $θ_o$ and $Φ_o$ is made, a subtraction is performed between corresponding members of the array of k RCD signal strength values acquired at the angles $θ_o$ and $Φ_o$ and members of the array of k field characterization signal strength values $SS_j$, i.e., corresponding members being members associated with the same pattern $P_j$. Prior to performing the subtraction members of the two arrays are normalized. The mean of all k values in the array is subtracted from each of the k values in the array and the result is divided by the standard deviation of all values in the array. The magnitudes of the absolute values of the differences between these normalized signal values is used to make a first determination of which ones of the k patterns to exclude from the subset of m patterns. The criterion for exclusion can be based in part on a predetermined number of patterns which are to be eliminated in order to remove the effects of reflections or other sources of interference. Next, the number of members remaining the subset can be further reduced, i.e., to m, by applying a criterion which eliminates those patterns having a relatively low sensitivity to changes in direction of the array 16 about the pointing angle are not included in the subset of m patterns. This results in a smaller subset of patterns exhibiting a relatively greater sensitivity to changes in angle over a desired range. In one example embodiment, the process eliminates patterns which do not exhibit a threshold value of change in magnitude relative to a corresponding magnitude at, for example, the angles $θ_o$ and $Φ_o$. That is, an evaluation can be made for each pattern at the following combinations of angles relative to the signal strength value at the angles $θ_o$ and $Φ_o$:

θ=+0.5° and Φ=+0.5°
θ=−0.5° and Φ=+0.5°
θ=+0.5° and Φ=−0.5°
θ=−0.5° and Φ=−0.5° by comparing the RCD signal strength values at each set of values for θ and Φ relative to the RCD signal strength values at the angles $θ_o$ and $Φ_o$. The threshold value of change, used as a criterion to eliminate patterns which do not exhibit sufficient sensitivity to changes in angle, can be established in a manner that reduces the number of patterns in the subset to m.

In the process of acquiring data to define the subset of m patterns, for all k of the receive patterns a set of signal strength data values $SS_j$ is acquired at the location where a determination is to be made of a pointing direction by receipt of rf signals from a source at one combination of angles, e.g., θ=0° and Φ=0° relative to a center line of the calibrated axis $A_x$. With reference to FIGS. 1 and 2, this field calibration data is collected by placement of a source 12 in a known position, having some ambiguity, relative to the position 13 of the antenna array. With acquisition of field measured characterization data values $SS_j$, m sets of RSR field data values $FSS_{j,θ,Φ}$ are determined in accord with the reduced set of m receive patterns $P_j$. Each set contains signal strength values for each of the same sets of angles θ and Φ for which the RCD values were acquired. The m patterns in the subset are determined based on sensitivity to changes in angle over a desired range. The resulting reduced set of data values $FSS_{j,θ,Φ}$ is used at the site in order to determine a pointing direction.

After field characterization and determination of the RSR field data values $FSS_{j,θ,Φ}$, the system 10 is used to determine location of a source of unknown position by acquiring a set of field measured $SS_j$ values from the source of unknown position. The most likely angle of direction from the origin, O, to the source is found by calculating correlations between $FSS_{j,θ,Φ}$ values and the set of $SS_j$ values acquired from the source of unknown location. Based on the highest correlation values this results in a Most Likely Angle (MLA) determination, i.e., a determination of a most likely pointing angle based on correlation values.

The set of RSR field data values may, in fact, be preferred over the reference characterization data because it can provide more accurate results or because less processing time is required to acquire and analyze a set of field measured data acquired with a smaller set of receive patterns (i.e., using fewer than k vectors $V_j$). The subset of receive patterns may omit patterns which have less angular sensitivity to, or which generate misleading correlations in, the particular environment in which the field signal strength data values $SS_j$ are measured. For example, when the field measured data are obtained at a different site than the location where the reference characterization data are collected, there may be a difference in the field patterns due to the presence of reflective surfaces such as vehicles or buildings.

To determine the pointing direction, correlations are performed between the field measured data set of m signal strength data values $SS_j$ and a subset of each of the aforedescribed 57 reference characterization data sets (each acquired at one angle θ and one angle Φ) where each subset comprises m signal strength data values $FSS_{j,θ,Φ}$ instead of k signal strength data values $SS_{j,θ,Φ}$.

The set of field measured data values is arranged as an ordered array of values (j=1 to m), where m<k, and each of the 57 sets of m RSR field data values is also arranged as an ordered array of values j=1 to m so that the $j^{th}$ value in each of the 57 arrays is a signal strength $SS_j$ or $SS_{j,θ,Φ}$, corresponding to the same pattern $P_j$. With this arrangement, correlations are calculated between the two arrays in each pair based on m pairs of signal strength data values ($SS_j$, $SS_{j,\theta,\Phi}$). The correlations are performed for 57 such pairs of arrays where each pair comprises m pairs of data values ($SS_j$, $SS_{j,\theta,\Phi}$).

Figure 4:
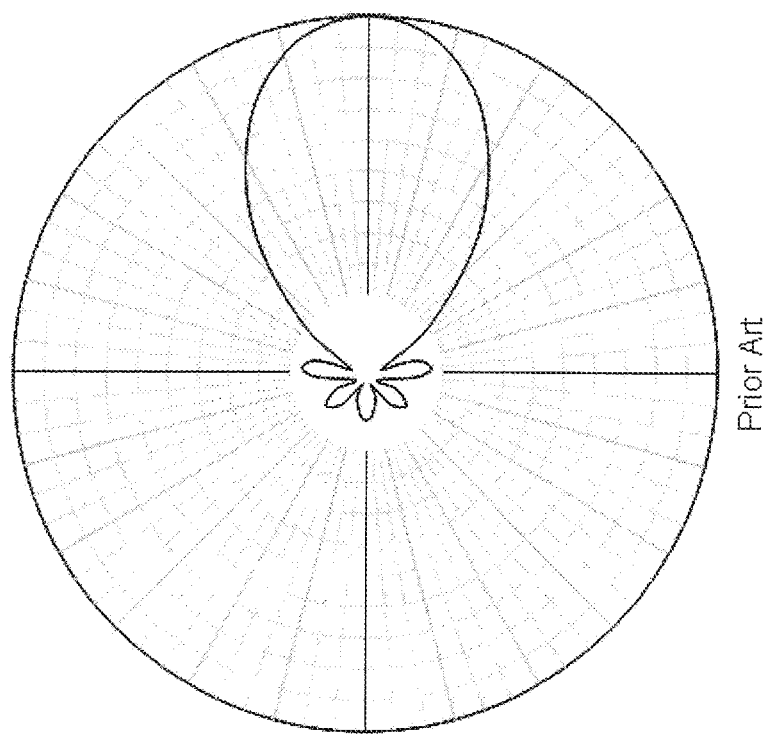
FIG. 4 illustrates a prior art directional pattern.

A feature of the example embodiments is generation of suitable receive patterns for determining direction of the object 11. In the past, direction finding has been performed with directional antennas. It is known to use an antenna that is more sensitive in one direction than other directions to determine the general direction from which a signal emanates. There are numerous examples in the literature of antenna types used for such purposes, including dipole antennas and Yagi antennas, which incorporate dipole elements. Phase array steerable antennas, typically designed to maximize signal strength, can also be used for manual direction finding based on receipt of maximum signal amplitude. FIG. 4 illustrates a directional pattern suitable for this approach.

Figure 5:
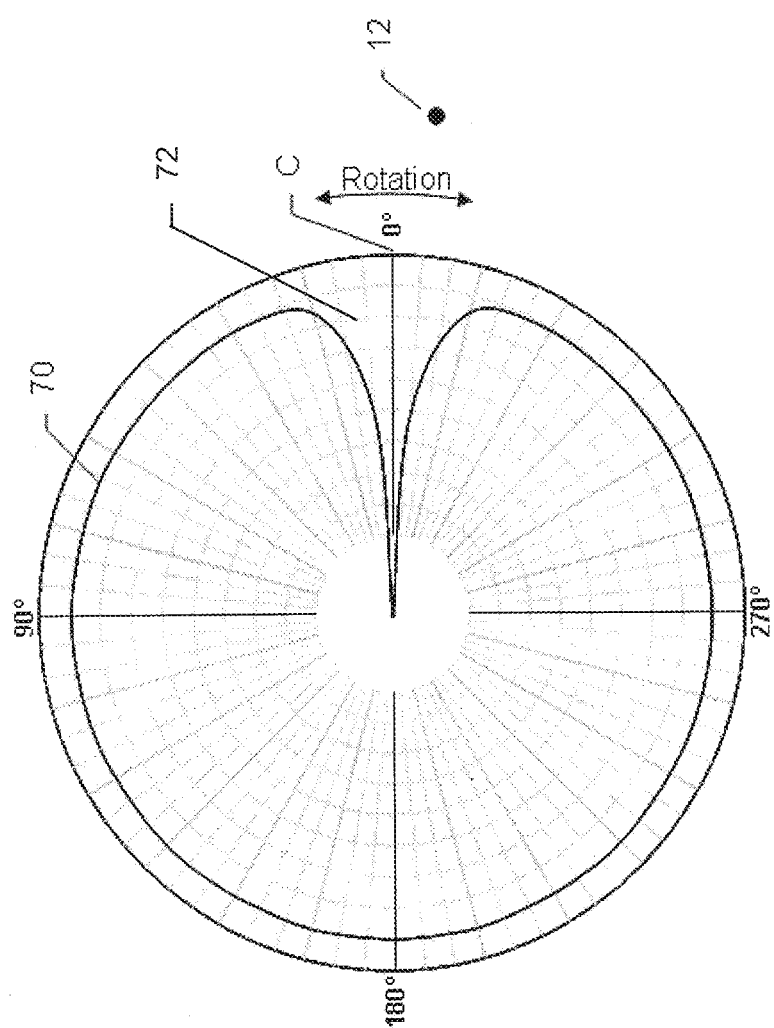
FIGS. 5, 6 and 7 illustrate applications of a cardoid shaped receive pattern according to methods of the invention.

In accord with embodiments of the invention, phase array antennas can be programmed to exhibit variable cardoid shaped receive patterns such as the exemplary pattern 70 of FIG. 5, having a shape which includes a null region 72. The direction of the source may be determined by detecting a minimum signal strength which is characteristic of the null center, C (i.e., the center position of the null). The shape of the pattern 70 is illustrated in a polar coordinate system which indicates relative sensitivity of the pattern as a function of angle when the phase array circuitry is programmed in accord with this pattern. When the angular position of the null center, C, is aligned with the source 12, the received signal will be a minimum. By physically rotating or electronically steering the null, a receive signal drop-off, which occurs when sweeping the pattern relative to a reference line, e.g. axis $A_x$, can be used to resolve the angle at which the center C of the null points at the source 12.

Figure 6:
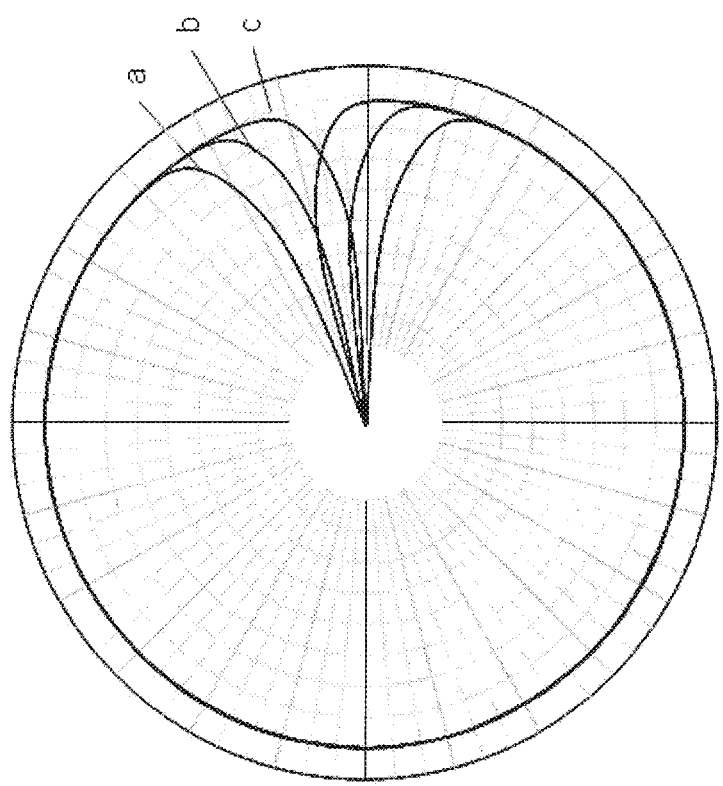

In one series of embodiments, a method may be based on symmetric antenna pattern shapes. A roll-off in signal strength occurs in a region, R, about the null as the null of the antenna pattern is rotated toward the source from either direction, there being a minimum at the center of the null. In FIG. 5 the center C of the null is shown to be at zero degrees relative to the axis $A_x$, it being understood that the pattern is rotatable relative to the axis by physically rotating the antenna array or by changing input to the phase array circuitry. This creates a series of similar or identical receive patterns of different angular orientations such that the null center, C, is swept through a range of angles relative to the source 12. FIG. 6 illustrates three exemplary rotations (a, b, c) of the cardoid shaped receive pattern 70. When the null region 72 is relatively wide, roll-off begins at a relatively large angle, as measured from the null center C, and the signal-to-noise ratio may fall below a discernable level before sweeping through the center of the null. The low signal-to-noise ratio renders it difficult to directly and precisely determine the center position of the null based on signal strength values. On the other hand, the farther the source is from the antenna, the more important it is to resolve the pointing angle of the center of the null with greater precision. In some instances it is important to resolve the center of the null with accuracy within one tenth of a degree or less. Depending on the slope, M, of the signal strength (i.e., the change in signal strength as a function of angle) in the roll-off region, relative to the center position of the null, an ambiguity of several degrees or larger may exist when attempting to align a system based on a null pattern.

However, according to embodiments of the invention, a phase array antenna system can be constructed wherein the null occurs across a relatively narrow angular width, thereby exhibiting a large and abrupt change in slope. An antenna array comprising a suitably large number of antenna elements can be programmed to exhibit a relatively steep characteristic signal strength roll-off so that ambiguity in the angle of the center position of the null can be resolved to a desired level of precision, e.g., one tenth of a degree.

Figure 7:
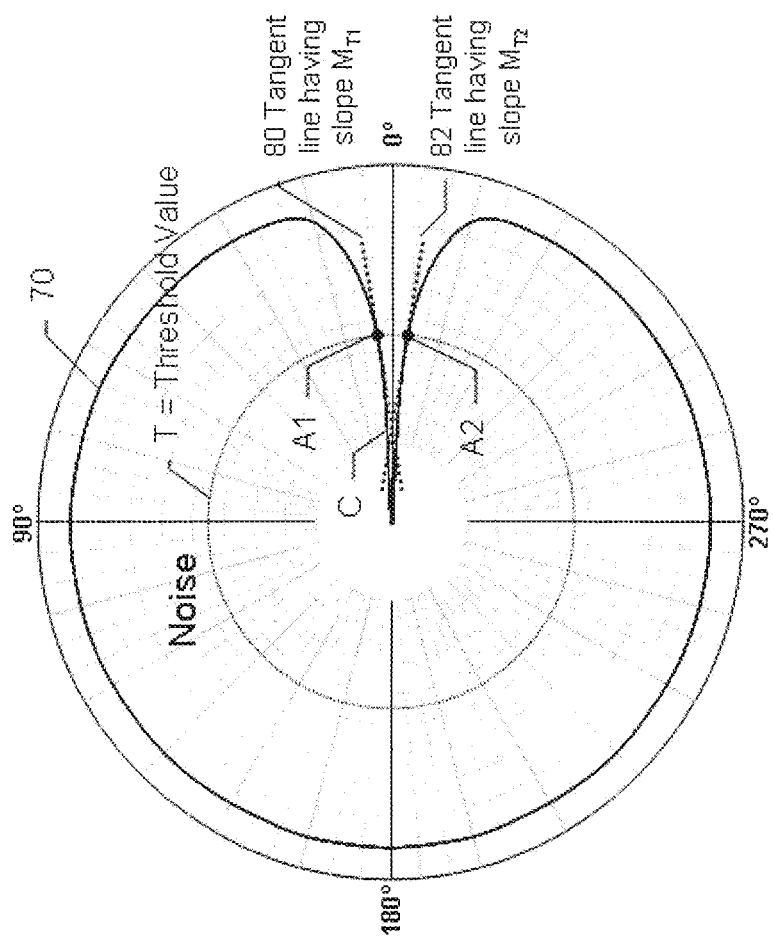

With reference to FIG. 7, unacceptable ambiguity in the angle of the center position of the null can be removed to obtain satisfactory pointing precision by finding a midpoint between any two angular positions, $A_1$ and $A_2$, each on a different side of the null center C, at which the signal has decreased below a threshold value, T. For example, the selected angular points may be positions at which signal becomes undetectable. In still other embodiments, the ambiguity can also be resolved, even when the antenna receive pattern is not perfectly symmetrical about the null. According to a method, the slope, M, is measured at the two angular positions $A_1$ and $A_2$, on different sides of the center position C, i.e., positions at which the signal strength decreases to the threshold value, T. The slopes at these angular positions $A_1$ and $A_2$ are referred to herein as $M_{T1}$ and $M_{T2}$. A line 80 is tangent to the point $A_1$ along the curve of the pattern 70, thereby exhibiting the slope $M_{T1}$ as it extends inward toward the center of the pattern 70 from the angular position $A_1$. Similarly, a line 82 is tangent to the point $A_2$ along the curve of the pattern 70, thereby exhibiting the slope $M_{T2}$ as it extends inward toward the center of the pattern 70 from the angular position $A_2$. The two tangent lines 80, 82 extend inward to where they intersect one another. The point of intersection is shown in FIG. 7 at the null center, C. More generally, the point of intersection of the two tangent lines is an estimate of the location of the null center, C, and the estimated angle at which the center, C, points toward the source 12.

Based on the above examples, for phase array antenna circuitry exhibiting limited angular resolution for locating a pointing direction, systems according to embodiments of the invention can provide pointing resolutions better than that achievable with individual patterns. That is, a direction finding system may utilize a series of patterns each having null characteristics that cannot be used individually to determine a pointing direction within a specified tolerance. By way of example, an antenna array can be steered to generate a series of cardoid-shaped patterns equivalent to a sequence generated by rotation of the pattern 70 about an axis of the antenna array. Thus for a desired angle of resolution, the pattern 70 is rotated about the axis of the antenna array in k incremental steps. The steps are sufficiently small to render a desired resolution based on correlation analyses. In one example, there are k vectors Vj each defining one of the pattern definitions in the sequence of rotations. With the antenna array comprising n elements E each vector comprises n values of phase shift information, each value serving as a phase shift input for one of the elements $E_i$. The n values collectively define one of k receive patterns, each pattern corresponding to a different rotational position of the cardoid pattern 70.

Signals $s_i$ received from the source 12 by individual ones of the n elements of the antenna array are each passed through a stage of the programmed phase shifting circuitry 30 so that a phase shift is imparted to each signal $s_i$ received from each element $E_i$ in accord with the n values in an applied vector $V_j$. The n phase shifted values $s_i$ in each pattern set are summed with the combiner circuitry 24 to generate phase adjusted received signal strength data values $SS_j$. each based on an individual phase vector $V_j$ and corresponding to one of k patterns $P_j$. The series of summed signal strengths, $SS_j$, derived from the k different rotational positions of the pattern 70 are used to perform correlation analyses by which the direction of the source 10 is determined.

Using the foregoing procedure in an iterative process, the board 17 may be physically adjusted, e.g., rotated with respect to the origin, O, to change the pointing direction of the array of elements $E_i$ relative to the most recently determined direction of the source 12 and bring the system 10 closer into alignment with the source. Then, in a subsequent iteration of the process, signal data $s_i$ may again be acquired and processed for some or all of the k rotational positions in the set to more accurately determine the direction of the source. The identified direction may be in a three-dimensional coordinate system, but the source location may also be determined along a line or plane, e.g., a horizontal plane along the horizon. The correlations are performed based on variations in angles θ along a plane parallel with the ground plane GP and/or based on variations in angles Φ above the ground plane.

As an alternative to relying on precise characteristics of one pattern, or relying on the characteristics of one less precise pattern shape which is steered about an axis, another method according to the invention provides series of different patterns that collectively provide variation in sensitivities as a function of angle. The selected patterns need not be selected based on changes in sensitivity over large angles. The set may be selected based on a number of patterns whose individual features exhibit measurable changes in sensitivity as a function of small portions of a larger range of angular displacements. Collectively the set includes patterns which exhibit sensitivity over the entire range while no single pattern need display sensitivity in a specific sub-range and there is no requirement that any of the patterns exhibit a symmetry in roll-off of sensitivity about the null.

For example, with reference to FIG. 3, the set $P_j$ may require that some of the members exhibit measurable changes in received signal level between selected angles that are adjacent one another, such as for θ=0.25 and θ=0.50 degrees at elevations for which Φ=0°. According to one set of criteria, the set may contain patterns which exhibit a deep null, i.e., a sharp roll off in signal strength, at or near specified angles.

Figure 8A:
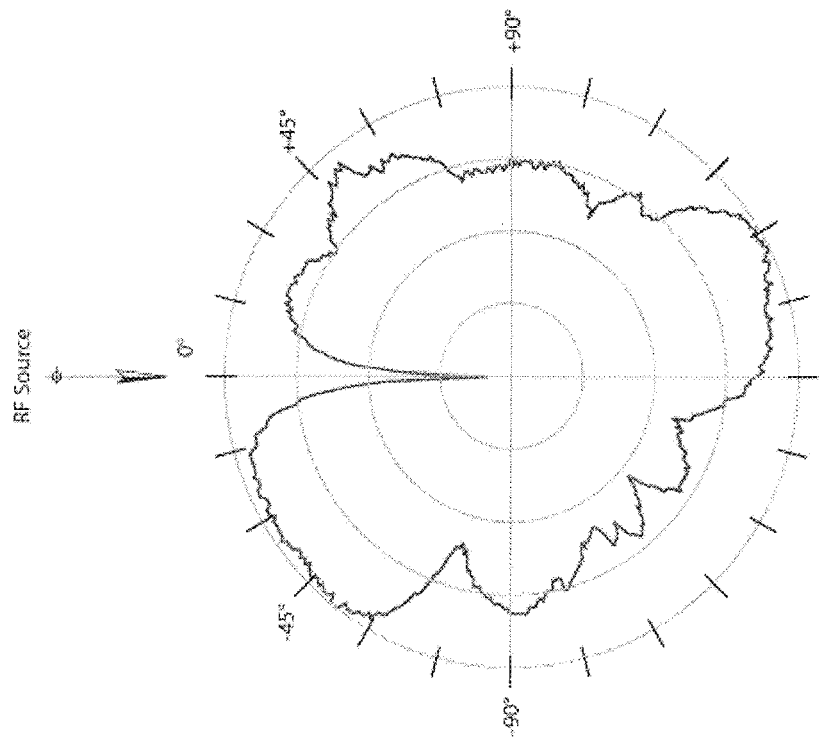
FIGS. 8A and 8B illustrate exemplary receive patterns suitable for application in embodiments of the invention.
Figure 8B:
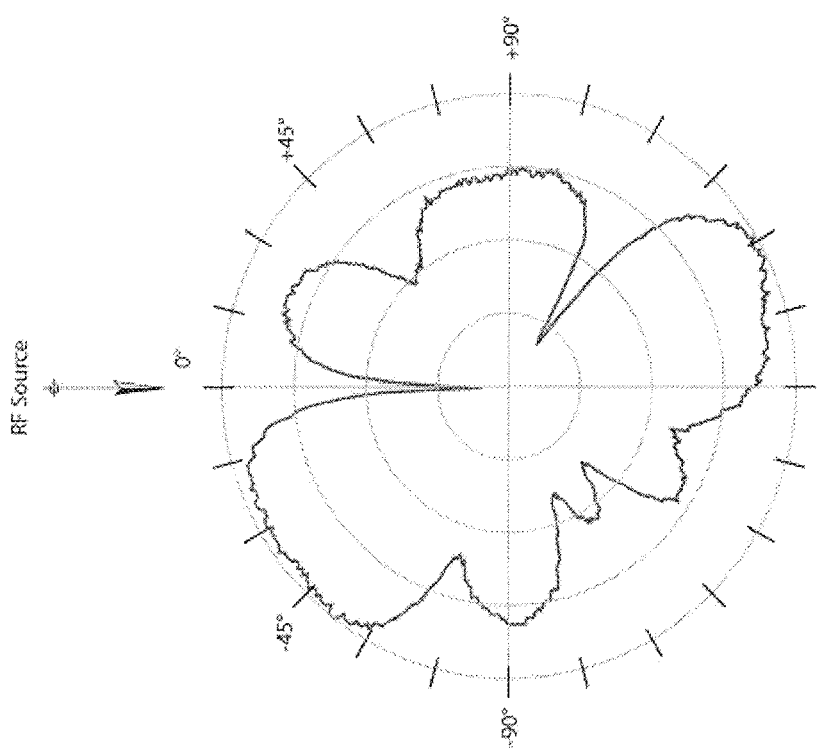

One process for selecting the set of patterns $P_j$ begins with random generation of a large number of vectors $V_j$. For the system 10, the phase shift information $PS_i$ in each vector may be a randomly generated series of three bit words, thereby allowing for seven possible values in each word. With n=16 elements $E_i$, there are $7^n$ possible patterns which can be generated. With random generation of seven bit words to create the patterns, there is no predictability as to whether any particular pattern would exhibit a null characteristic (i.e., a significant decrease in sensitivity as a function small angle variation) at any particular angle. On the other hand, for a given set of angles θ and Φ, such as illustrated in FIG. 3, by randomly generating a sufficiently large set of such patterns there is a reasonable likelihood that, for each pair of adjacent angles in a range of interest, some of the patterns will exhibit a significant change in signal strength $s_i$ such that the signal strength data values $SS_i$ for the two adjacent angles, e.g., θ=0.25 degree and θ=0.50 degree, as noted for two angles referenced in FIG. 3 will differ. With this assumption, a large set of randomly generated patterns can be tested with criteria to determine a subset containing members exhibiting measurable changes in sensitivity between all pairs of adjacent angles. For example, beginning with one million randomly generated patterns, a set of k=10,000 receive patterns can be identified based on angle sensitivity over a range of 2π. Representative examples of patterns selected, based on sensitivity criteria, from randomly generated patterns, are illustrated in FIGS. 8A and 8B.

A feature of the invention is that it is now possible to utilize relatively inexpensive programmable phase array circuitry such as the circuitry 14 of FIGS. 1 and 2 to acquire precision location information. This capability is based in part on recognition that with a simple antenna array it is possible to generate a series of patterns having highly varied sensitivities as a function of angle. As an alternative to designing one single pattern having optimum attributes, e.g., the cardoid shaped pattern exhibiting a sharp roll-off in sensitivity about the null region 72, a number of patterns may be used to acquire signal strength data. Correlation techniques can be applied to determine the direction of a source based on characterization data containing pattern sensitivity information which has a strong dependence on angle of orientation relative to the source.

The system 10 can be implemented with an antenna array comprising relatively few elements $E_i$ and relatively coarse phase shift information because the purpose of pattern generation is not to acquire predesigned pattern shapes. Rather, it is with a recognition that a large number of the patterns so generated will exhibit useful dependence on angle of orientation. Specifically, for the exemplary phase array circuitry 14 comprising 16 elements $E_i$, a set of k patterns $P_i$ has been identified comprising members which exhibit sensitivities at different angles relative to the chosen line of reference, e.g., the axis $A_x$.

Embodiments of the invention can be applied to locate goods in a warehouse. For example, pallets may be fixed with transmitters to send signals in order to locate the pallets according to a disclosed method. Multiple receivers may be positioned inside or near the warehouse to provide inventory information and to locate the inventory. Lost inventory can be rapidly found with a method according to the invention. A disclosed method may be applied to track the location of a shopping cart in a retail environment by attaching a transmitter to the cart. In another application equipment or personnel can be located on a large campus such as an air field, on a college campus or in a zone patrolled by law enforcement.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method for defining a set of receive patterns for use in a phase array antenna system to determine the direction of an object, comprising:
   providing a first rf source at a first position;
   providing an antenna comprising a plurality of elements each arranged to separately receive an rf signal;
   providing a first series of antenna receive patterns, each pattern defined by a set of phase shift values;
   sequentially positioning the antenna at each in a set of first angles of orientation with respect to the first position of the first rf source;

while the antenna is positioned at each angle of orientation, applying the sets of phase shift values to individually modify each rf signal received by each element and acquiring a first set of signal strength data for each receive pattern at each angle;

using the first set of signal data to determine for each angle the relative sensitivity of each receive pattern to the rf signal;

identifying for each angle one or more receive patterns exhibiting relatively low signal strengths or sensitivities; and defining a set of antenna receive patterns which is a first subset of the first series, which set (i) includes for each first angle of orientation at least one pattern having a relatively low signal strength and (ii) excludes other receive patterns present in the first series;

providing an rf source, which may be the same source as, or a source different than, the first rf source, at a second position;

placing the antenna at each of a second number of angles of orientation with respect to the second position, wherein the second angles include at least one of the first angles of orientation;

while the antenna is positioned at each angle in the second number of angles of orientation with respect to the second position of orientation, acquiring a third set of signal strength data at the second position by applying sets of phase shift values for those receive patterns in the subset of the first series to individually modify each rf signal received by each element in accord with each of the receive patterns in the subset of the first series;

using the third set of signal strength data to identify one or more receive patterns exhibiting relatively low signal strengths at the second position; and defining a second subset of antenna receive patterns which is a subset of the first subset of the first series, which second subset (i) includes for each in the first number of angles of orientation at least one pattern exhibiting a relatively low signal strength at the second position and (ii) excludes one or more receive patterns in the first subset.

2. The method of claim of 1 wherein the step of acquiring signal strength data from the object is performed at the second position using only members of the second subset of receive patterns.

3. The method of claim of 1 wherein the step of positioning the antenna at each of a second number of angles of orientation with respect to the second position only positions the antenna at one angle.

4. The method of claim 1 wherein the same rf source is used to acquire the first set of signal strength data and the third set of signal strength data.

5. The method of claim 1 wherein
the object is positioned at the second position; and
the object and the second source are positioned different distances from the antenna.

6. The method of claim 1 wherein the first series of patterns includes over one million patterns and members of the subset are fewer than one hundred thousand patterns.

7. The method of claim 1 wherein the object is at a location different than the first location.

* * * * *